Aug. 25, 1959     H. W. DRIEHAUS     2,901,230
TRIMMER CHAIN TENSIONING MEANS FOR BORING TYPE MINING MACHINE
Filed April 25, 1958     2 Sheets-Sheet 1

INVENTOR.
Herman W. Driehaus
BY
Murray A. Gleeson
ATTORNEY

Aug. 25, 1959    H. W. DRIEHAUS    2,901,230
TRIMMER CHAIN TENSIONING MEANS FOR BORING TYPE MINING MACHINE
Filed April 25, 1958    2 Sheets-Sheet 2

INVENTOR.
Herman W. Driehaus
BY
Murray A. Gleeson
ATTORNEY

United States Patent Office 2,901,230
Patented Aug. 25, 1959

2,901,230

TRIMMER CHAIN TENSIONING MEANS FOR BORING TYPE MINING MACHINE

Herman W. Driehaus, Chicago, Ill., assignor to Goodman Manufacturing Company, Chicago, Ill., a corporation of Illinois Application April 25, 1958, Serial No. 730,872

3 Claims. (Cl. 262—7)

This invention relates to improvements in mining machines of the boring type and more particularly relates to boring machines, adjustable to cut in coal seams of various thicknesses.

A principal object of the invention is to provide a simplified and improved means for maintaining a uniform degree of tension on the trimmer chain of a boring machine adjustable to operate in seams of various thicknesses.

A further object of the invention is to improve upon the chain tensioning means of mining machines of the boring type, by providing a stabilized take-up connection from the upper trimmer bar of the machine to the tensioning means for the cutter chain.

A further object of the invention is to provide a mining machine of the boring type in which the upper and lower trimmer bars are vertically adjustable to accommodate the machine to cut in coal seams of various thicknesses, having a take-up idler for maintaining a uniform tension on the trimmer cutter chain of the machine, in which a stabilized self-adjusting link connects the upper trimmer bar to the tensioning idler for the cutter chain.

A further object of the invention is to provide a tensioning means for the trimmer chain of a continuous mining machine enabling the trimmer bars to be vertically adjusted to accommodate the machine to cut in seams of various thicknesses, in which a hydraulic cylinder and piston unit provides a self-adjusting link for the tensioning means, and in which a stabilized flexible take-up connection is provided between the cylinder and piston and the take-up idler for the chain.

These and other objects of the invention will appear from time to time as the following specification proceeds and with reference to the accompanying drawings wherein.

Figure 1:
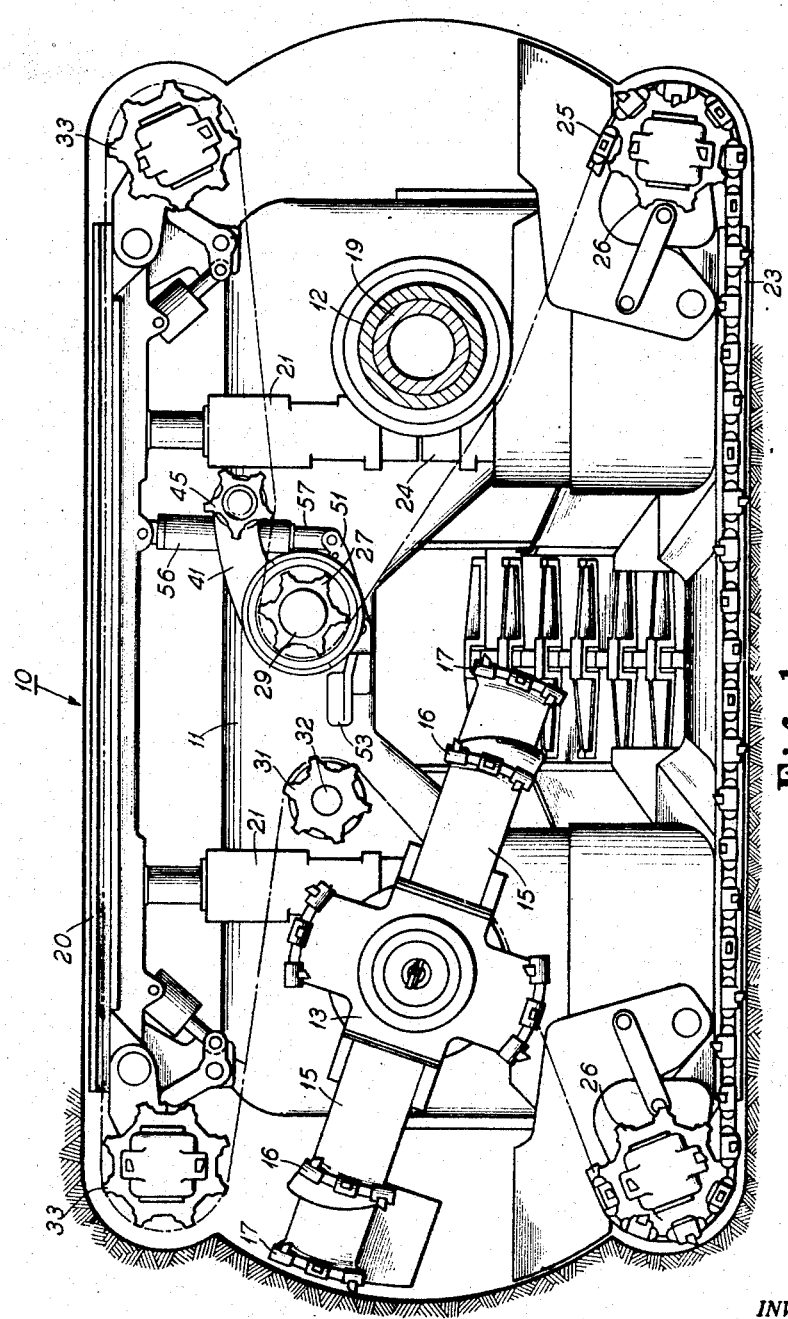
Figure 1 is a front end view of a continuous mining machine of the boring type having a chain tensioning arrangement constructed in accordance with the invention as a part thereof.

In the embodiment of the invention illustrated in the drawings, I have shown a continuous mining machine 10 of the boring type in which the boring heads and trimmer bars are vertically adjustable to operate in coal seams of varying thicknesses. The boring machine, as generally shown in Figure 1, includes a gear casing or cutter frame 11, mounted on the main frame (not shown) of the machine, for vertical adjustment with respect thereto, and having spaced hubs 12 extending forwardly therefrom, forming supports for rotatable boring heads 13.

Each boring head 13 has radial arms 15, having radially spaced arcuate cutters 16 and 17 mounted thereon, the outermost cutters 17 being radially adjustable to adjust the boring head to the desired cutting height of the machine. The boring heads 13 are driven from hollow shafts 19, journalled within the hubs 12 and driven in opposite directions from a suitable motor and reduction gearing (not shown) to drive the boring heads to progress the cut and broken down material toward the center of the machine.

The cutter frame 11 also forms a support for an upper cutter or trimmer bar 20, mounted on said cutter frame on laterally spaced hydraulic jacks 21, operable to vertically adjust the trimmer bar 20 to the required cutting height of the machine and to retain said trimmer bar in a selected adjusted cutting position.

The cutter frame 11 also forms a support for a lower trimmer bar 23, shown as extending parallel to the upper trimmer bar 20 and supported on the cutter frame 11 by hydraulic jacks 24, depending from said cutter frame. The hydraulic jacks 24 may be in vertical alignment with the jacks 21. Said jacks are connected with the cutter bar 23 in a suitable manner, a portion of one jack only being herein shown, since the jacks and their connection to the cutter bar 23 are no part of the present invention.

The trimmer bars 20 and 23 have the usual endless cutter chain 25 guided for movement therealong for trimming the upstanding and depending cusps left between the boring heads 13.

Figure 3:
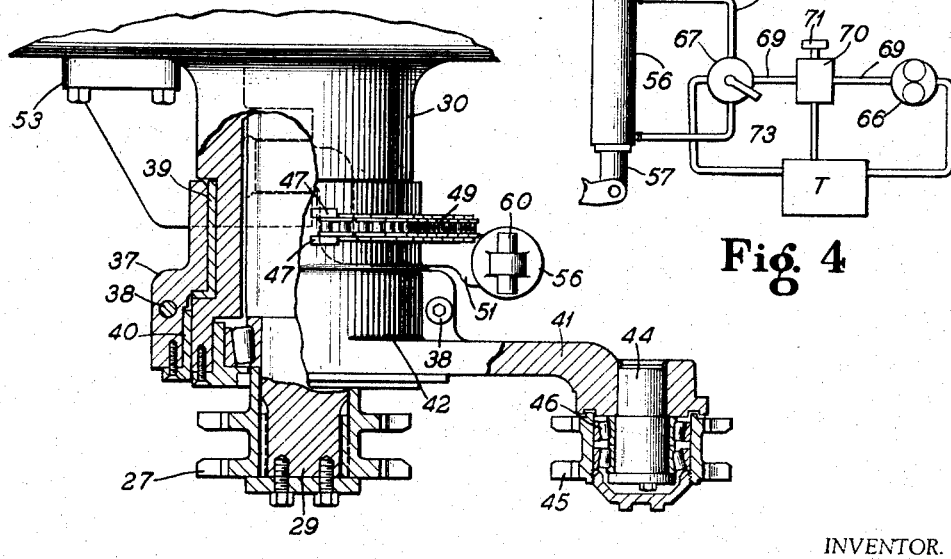
Figure 3 is an enlarged fragmentary plan view of the tensioning device, with certain parts broken away and certain other parts shown in section taken substantially along line 3—3 of Figure 2.

The cutter chain 25 is trained about corner sprockets 26 at opposite ends of the lower trimmer bar 23 and extends angularly inwardly and upwardly therefrom, one run of said cutter chain being trained about a drive sprocket 27, shown in Figure 3 as being splined or otherwise secured to a drive shaft 29, suitably journalled within a hub 30, extending outwardly from the gear casing or cutter frame 11, and driven from suitable drive gearing (not shown) enclosed within the cutter frame 11.

The opposite run of the cutter chain 25 is trained about an idler sprocket 31 mounted on the cutter frame 11 on a shaft 32, extending forwardly from the frame 11.

The two runs of the cutter chain are trained about corner sprockets 33 at opposite ends of the cutter bar 20, and are guided for movement along said cutter bar, to cut out the cusps depending from the mine roof between the boring heads 13.

Referring now to the tensioning means for maintaining a uniform tension on the cutter chain 25 in the various positions of adjustment of the cutter bars 20 and 23 with respect to the main frame 10, a stepped sleeve or ring 37 is shown in Figure 3 as being journalled on the hub 30 on bearings 39 and 40 for rocking movement about an axis concentric with the axis of rotation of the shaft 29.

The sleeve 37 is shown in Figure 3 as being of a split construction, the halves of the sleeve being retained together, as by cap screws 38 or the like. A take-up arm 41 is shown as extending from a top half 42 of the sleeve 37, adjacent the outer end of said sleeve, and laterally toward an outer side of the machine. The take-up arm 41 has a stub shaft 44 mounted therein and extending forwardly therefrom, having a take-up idler 45 journalled thereon on anti-friction bearings 46. The take-up idler 45 is herein shown as being in the form of a sprocket, although it need not be a sprocket, but may be a roller or shoe adapted to exert tensioning pressure on the cutter chain 25.

Figure 2:
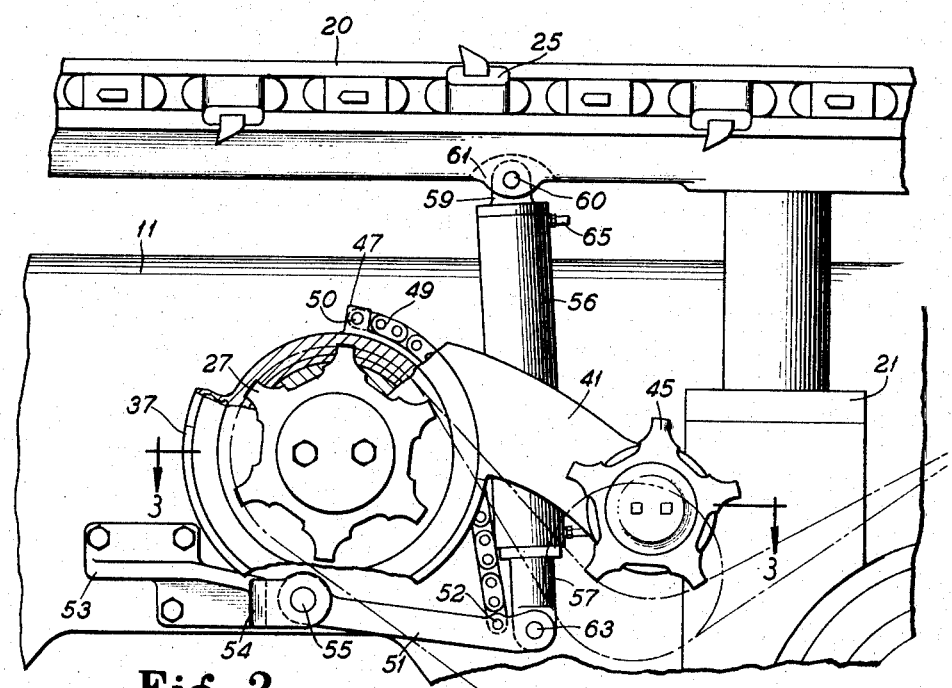
Figure 2 is an enlarged fragmentary detail end view of the machine, illustrating certain details of the tensioning device.
Figure 4:
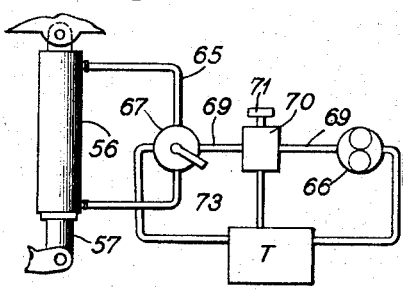
Figure 4 is a diagrammatic view showing one form of hydraulic actuating circuit which may be employed to compensate for differences in movement between the upper and lower trimmer bars of the machine.

The small diameter portion of the sleeve 37 is shown as having spaced lugs 47 extending radially outwardly as therefrom, having a flexible drive member, such as a chain 49 pivotally connected thereto as by a pin 50. The chain 49 is shown in Figures 2 and 3 as being partially wrapped about the periphery of the small diameter portion of the sleeve 37 and as extending downwardly therefrom to an equalizing lever 51, to which it is connected adjacent the outer end thereof, as by a pin 52. The equalizing lever is shown in Figure 2 as being pivoted adjacent its inner end to a bracket 53, mounted on and extending outwardly from the cutter frame 11, inwardly of and beneath the drive sprocket 27. The bracket 53 has a connecting end portion 54, within which the inner end of the equalizing lever 51 extends. A pivot pin 55 spaced beneath the sprocket 27 is provided to pivotally connect the equalizing lever 51 to the bracket 53.

Pressure is maintained on the equalizing lever 51 to maintain the take-up idler 45 in tensioning engagement with the cutter chain 25 in a manner similar to that shown and described in application Serial No. 651,027 filed by Walter Silks on April 4, 1957, and entitled "Trimmer Chain Tensioning Arrangement for Boring Type Mining Machine," now Patent No. 2,877,005. A hydraulic cylinder and piston unit including a cylinder 56 having a piston rod 57 extensible therefrom, depends from the upper trimmer bar 20. As herein shown, the cylinder 56 has a connecting ear 59 extending upwardly therefrom, pivotally connected to the underside of the trimmer bar 20 as by a pivot pin 60, pivotally connecting said ear between spaced connectors 61, formed integrally with said trimmer bar. The piston rod 57 is shown as being connected at its lower end to the outer end of the equalizing lever 51 as by a pivot pin 63.

The cylinder 56 may be a double acting cylinder and has a pressure line 65 leading to the upper end thereof supplied with fluid under pressure from a suitable source of pressure such as a pump 66 under the control of a four-way valve 67 in a pressure line 69, connected from the pump 66 to a relief valve 70. The relief valve 70 is connected in the pressure line 69, and is shown as being an adjustable relief valve in which the pressure in the head end of the cylinder 56 may be adjusted by operation of an adjustment knob 71, as in the aforementioned Silks application Serial No. 651,027. The valve 67 is also movable into position to admit fluid under pressure to the piston rod end of the cylinder 56 through a pressure line 73. When the valve 67 is in position to admit fluid under pressure to the piston rod end of the cylinder 56, the pressure line 65 is connected to tank through the valve 67, to accommodate retractable movement of the piston rod 57 with respect to the cylinder 56. Fluid under pressure is admitted to the piston rod end of the cylinder 56 under control of the valve 67, to release tension from the chain 49 in cases where it is desired to relieve tension from the cutter chain 25, to accommodate repair or renewal of the cutter chain.

During normal operation of the machine, the pump 66 is operating to supply fluid under pressure to the head end of the cylinder 56 and maintain a predetermined tension on the cutter chain 25, determined by the setting of the relief valve 70. Thus, as the cutter bar 20 is raised or lowered, the piston 56 and piston rod 57 will normally act as a solid link and maintain the tension idler 45 in engagement with the cutter chain 25, to maintain the cutter chain under uniform tension in the various positions of adjustment of the cutter bar 20 with respect to the cutter frame 11.

In cases, however, where the upper cutter bar 20 and the lower cutter bar 23 are both vertically adjusted, it will be necessary for the length of the link, determined by the piston 56 and piston rod 57, to vary to allow for movement of the lower cutter bar 23 with respect to the cutter frame 11. In such cases where movement of the cutter bars is such as to relieve tension from the chain 25, fluid under pressure entering the head end of the cylinder 56 under control of the relief valve 70, will extend the piston rod 57 and increase the length of the link an amount sufficient to maintain the tension on the cutter chain 25 uniform. In a contrary manner, when the two cutter bars 20 and 23 are adjusted with respect to the cutter frame 11 in a direction to increase the tension on the cutter chain 25, the pressure in the head end of the cylinder 56 will tend to increase. This increased pressure will, therefore, be relieved through the relief valve 70, which accommodates retractable movement of the piston rod 57 with respect to the cylinder 56.

The tensioning cylinder 56 and piston rod 57, thus, automatically maintain a uniform pressure on the equalizing lever 51 and thereby maintain a uniform tension on the cutter chain 25, through the tensioning idler 45, in all positions of adjustment of the cutter bars 20 and 23 with respect to the cutter frame 11.

While I have herein shown and described one form in which my invention may be embodied, it will be understood that various changes in the invention may be effected without departing from the spirit and scope of the novel concepts of the invention, as defined by the claims appended hereto.

I claim as my invention:

1. In a mining machine of the boring type having a plurality of boring heads for forming contiguous bores in advance of the machine, a frame, upper and lower horizontally extending chain carrying cutter bars mounted on said frame immediately to the rear of said boring heads for vertical adjustment with respect thereto, a drive sprocket and an idler sprocket rotatably mounted on said frame in inwardly spaced relation with respect to opposite ends of said cutter bars and between the latter, tensioning means for said cutter chain comprising a rocking arm pivotally mounted on said main frame between said cutter bars and in inwardly spaced relation with respect to the ends thereof, a tension idler on said rocking arm and meshing with said cutter chain, a self-adjusting connection between the upper of said cutter bars and said tension idler comprising a cylinder and piston unit pivotally connected to the upper of said cutter bars and depending therefrom, and means stabilizing said cylinder and piston unit and applying a take-up force on said idler sprocket, comprising a stabilizing link pivotally connected between said main frame and said cylinder and piston unit, and a flexible connecting member connected between said cylinder and piston unit and said rocking arm and maintained in position to exert a force on said rocking arm at substantially right angles to a radial line extending through the axis of rocking movement of said rocker arm and to thereby maintain a uniform force on said rocking arm and a uniform tension on said cutter chain in all positions of said cylinder and piston unit and said cutter bars with respect to each other.

2. In a mining machine of the boring type having a plurality of boring heads for forming contiguous bores in advance of the machine, a main frame, upper and lower horizontally extending chain-carrying cutter bars mounted on said main frame immediately to the rear of said boring heads for vertical adjustment with respect to said main frame, a continuous cutter chain trained for movement along said cutter bars, a drive sprocket and an idler sprocket rotatably mounted on said main frame in inwardly spaced relation with respect to opposite outer ends of said cutter bars and between the latter, an arm pivotally mounted on said main frame for pivotal movement about the axis of one of said sprockets, a tension idler on the outer end of said arm having tensioning engagement with said cutter chain, and self-take-up means maintaining said tension idler in tensioning engagement with said cutter chain with a uniform tension in all positions of adjustment of said cutter bars with respect to each other comprising an equalizing link pivotally mounted on said main frame beneath said rocking arm and adjacent the pivotal axis thereof, a flexible drive member connecting said equalizing link to said rocking arm to rock said rocking arm in a tensioning direction upon depressible movement of said equalizing link, a cylinder and piston unit pivotally connected to the upper of said cutter bars, a piston rod extensible therefrom and having pivotal connection with said equalizing link, means maintaining a predetermined pressure on said cylinder and piston unit and accommodating extensible and retractable movement of said piston rod to accommodate for differences in movement of said cutter bars upon adjustment thereof, and the connection from said flexible drive member to said rocking arm being such as to exert a force at right angles to a radial line extending through the axis of rocking movement of said rocking arm in all positions of said cylinder and piston unit with respect to said rocking arm to maintain the tension on said cutter chain uniform in all positions of adjustment of said cutter bars with respect to said boring heads.

3. In a mining machine of the boring type having a plurality of boring heads for forming contiguous bores in advance of the machine, a main frame, horizontally extending upper and lower chain-carrying cutter bars mounted on said main frame immediately to the rear of said boring heads for vertical adjustment with respect to said main frame and having corner sprockets at opposite ends thereof, a continuous cutter chain trained for movement along said cutter bars about said corner sprocket, a drive sprocket and an idler sprocket rotatably mounted on said main frame in inwardly spaced relation with respect to opposite outer ends of said cutter bars and between the latter, a sleeve pivotally mounted on said main frame for rocking movement about the axis of one of said sprockets, an arm extending from said sleeve toward the outer side of said main frame, a tensioning idler on said arm adapted to have tensioning engagement with said cutter chain, an equalizing link pivotally connected to said main frame beneath said sleeve and adjacent the axis of rotation thereof, a flexible drive member connected with said equalizing link at one end and partially wrapped around and connected with said sleeve at its opposite end, and a self-adjusting link connected between the upper of said cutter bars and said equalizing link comprising a hydraulic cylinder and piston unit having an extensible piston rod, and means maintaining said cylinder and piston unit under pressure and accommodating extensible and retractable movement of said piston rod, to compensate for differences in movement between said cutter bars, upon vertical adjustment of said cutter bars, whereby a tangential take-up force is exerted on said sleeve in all positions of adjustment of said cutter bars and cylinder and piston unit with respect to said sleeve.

References Cited in the file of this patent
UNITED STATES PATENTS
2,743,093    Robbins _____ Apr. 24, 1956